(12) United States Patent
Kudo et al.

(10) Patent No.: US 9,245,557 B2
(45) Date of Patent: Jan. 26, 2016

(54) HEAD ASSEMBLY AND DISK DEVICE PROVIDED WITH THE SAME

(71) Applicant: KABUSHIKI KAISHA TOSHIBA, Minato-ku, Tokyo (JP)

(72) Inventors: Masaya Kudo, Yokohama (JP); Yasutaka Sasaki, Yokohama (JP); Takuma Kido, Mitaka (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/726,074

(22) Filed: May 29, 2015

(65) Prior Publication Data

US 2015/0262600 A1 Sep. 17, 2015

Related U.S. Application Data

(62) Division of application No. 14/300,732, filed on Jun. 10, 2014, now Pat. No. 9,047,896.

(30) Foreign Application Priority Data

Feb. 21, 2014 (JP) .................. 2014-031426

(51) Int. Cl.
*G11B 21/21* (2006.01)
*G11B 5/55* (2006.01)
*G11B 5/48* (2006.01)
*G11B 5/596* (2006.01)

(52) U.S. Cl.
CPC ............ *G11B 5/5552* (2013.01); *G11B 5/4833* (2013.01)

(58) Field of Classification Search
CPC .. G11B 5/4833; G11B 5/4873; G11B 5/5552; G11B 5/486; G11B 5/596; G11B 5/5556; G11B 5/4853; G11B 5/4826; G11B 5/482
USPC ............................................ 360/245.9, 294.4
IPC ............... G11B 5/4833, 5/4873, 5/5552, 5/486, G11B 5/596, 5/5556, 5/4853, 5/4826, 5/482
See application file for complete search history.

(56) References Cited

U.S. PATENT DOCUMENTS 6,297,936 B1 * 10/2001 Kant .................... G11B 5/5552
                                                              360/294.4
7,375,930 B2     5/2008 Yang et al.
(Continued)

FOREIGN PATENT DOCUMENTS

JP      2005-158242      6/2005
JP      2007-317349     12/2007
(Continued)

*Primary Examiner* — Will J Klimowicz
(74) *Attorney, Agent, or Firm* — Knobbe, Martens, Olson & Bear LLP

(57) ABSTRACT

According to one embodiment, a head gimbal assembly includes a support plate, a wiring member including a thin metallic plate, an insulating layer and a conductive layer, the wiring member including a tongue portion located on a convex portion of the support plate, a proximal end portion fixed onto the support plate, and a bridge portion bridged between the tongue portion and the proximal end portion and including a inflection point with respect to a height direction of warping, a magnetic head attached to the tongue portion, and a piezoelectric element bonded to the bridge portion at a section between the proximal end portion and the inflection point.

18 Claims, 7 Drawing Sheets

(56) References Cited

U.S. PATENT DOCUMENTS

| | | |
|---|---|---|
| 7,525,769 B2 | 4/2009 | Yao et al. |
| 8,310,790 B1 | 11/2012 | Fanslau, Jr. |
| 8,988,831 B1 * | 3/2015 | Kido .................... G11B 5/4853 360/245.9 |
| 9,093,089 B1 * | 7/2015 | Aoki ........................ G11B 5/48 |
| 2007/0230060 A1 | 10/2007 | Yao et al. |
| 2008/0266713 A1 | 10/2008 | Yao et al. |
| 2011/0211274 A1 | 9/2011 | Kuwajima |
| 2015/0213818 A1 * | 7/2015 | Imai .................... G11B 5/4873 360/294.4 |

FOREIGN PATENT DOCUMENTS

| | | |
|---|---|---|
| JP | 2008-152908 | 7/2008 |
| JP | 2008-269770 | 11/2008 |
| JP | 2011-138596 | 7/2011 |
| JP | 2013-004165 | 1/2013 |

* cited by examiner

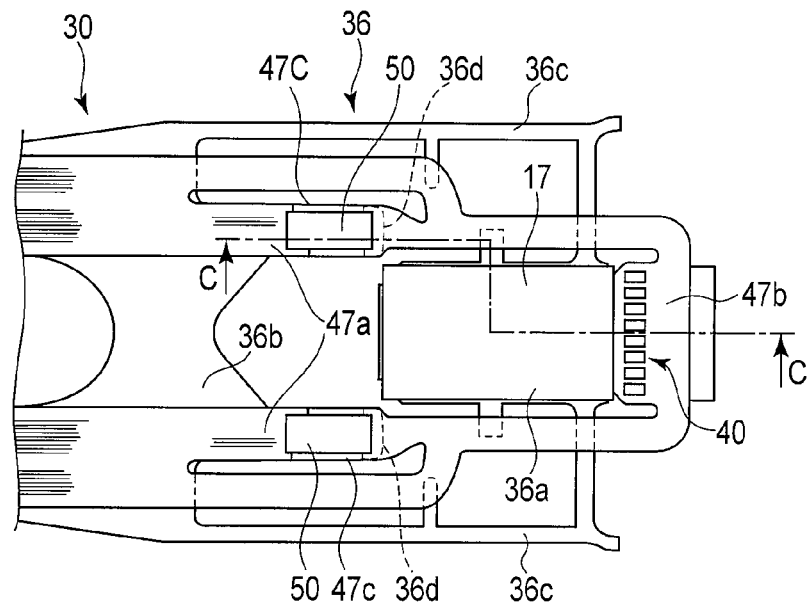
F I G. 6
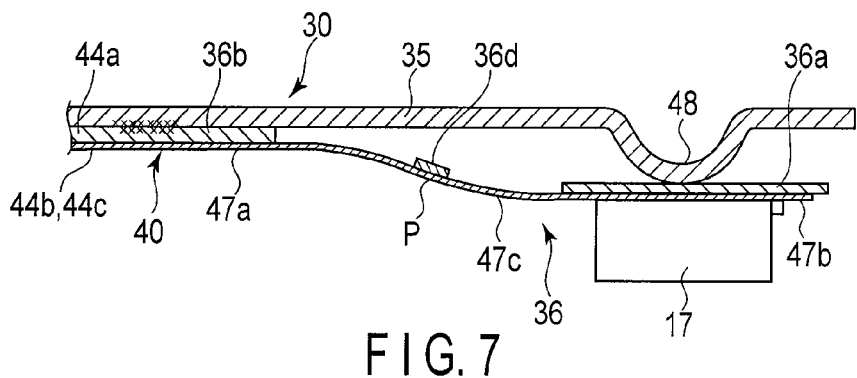
F I G. 7
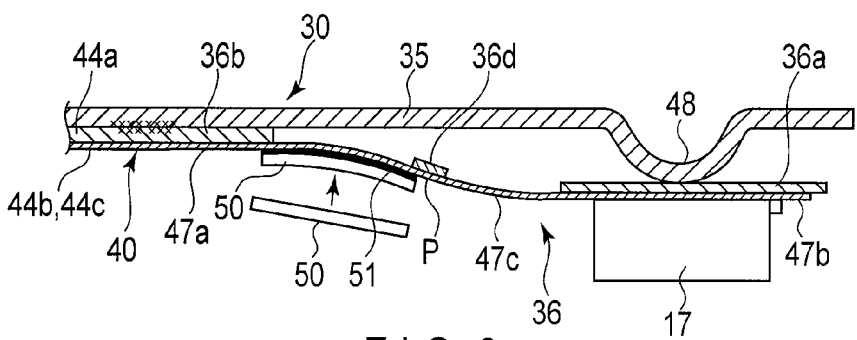
F I G. 8

Result of simulation performed with finite-element analysis (Stroke amount)

HEAD ASSEMBLY AND DISK DEVICE PROVIDED WITH THE SAME

CROSS-REFERENCE TO RELATED APPLICATIONS

This application is a divisional of U.S. patent application Ser. No. 14/300,732, filed on Jun. 10, 2014, which is based upon and claims the benefit of priority from Japanese Patent Application No. 2014-031426, filed Feb. 21, 2014; the entire contents of these applications are incorporated herein by reference.

FIELD

Embodiments described herein relate generally to a head gimbal assembly to be applied to a disk device, and also a disk device provided with the head gimbal assembly.

BACKGROUND

In recent years, disk devices such as magnetic disk drives and optical disk drives have widely been used as external recording devices of computers and image recording devices.

As such a disk device, for example, a magnetic disk drive generally comprises a magnetic disk provided in a case, a spindle motor which supports and rotates the magnetic disk, and a head gimbal assembly (HGA) which supports a magnetic head. The head gimbal assembly includes a suspension attached to a distal end portion of an arm, a wiring member (a flexure or a wiring trace) provided on the suspension and extending outwards from the suspension, and a magnetic head supported on the suspension through a gimbal portion of the wiring member. The wiring member includes wirings electrically connected to the magnetic head.

In recent years, there is proposed an HGA wherein thin piezoelectric elements (PZT elements) are mounted at a gimbal portion of a wiring member, and a magnetic head is minutely displaced in a seek direction by expansion and contraction of the piezoelectric elements. According to the HGA, operation of the magnetic head can be minutely controlled by controlling a voltage to be applied to the piezoelectric elements.

BRIEF DESCRIPTION OF THE DRAWINGS

FIG. 6 is a plan view of a distal end portion of the head gimbal assembly;

FIG. 7 is a cross-sectional view of a piezoelectric-element mounting portion, taken along line C-C in FIG. 6, with a piezoelectric element still not mounted;

FIG. 8 is a cross-sectional view of the piezoelectric-element mounting portion, taken along line C-C in FIG. 6, with the piezoelectric element mounted;

DETAILED DESCRIPTION

Various embodiments will be described hereinafter with reference to the accompanying drawings. In general, according to one embodiment, a head gimbal assembly comprises:

a support plate comprising a distal end portion with a convex portion;

a wiring member comprising a thin metallic plate, an insulating layer on the thin metallic plate and a conductive layer on the insulating layer, to form a plurality of wirings, the wiring member being attached to the support plate at the thin metallic plate side, the wiring member comprising a tongue portion located on the convex portion, a proximal end portion fixed onto the support plate apart from the tongue portion, and a bridge portion bridged between the tongue portion and the proximal end portion, the bridge portion being allowed to be warped from the proximal end portion to the tongue portion in accordance with a projection height of the convex portion, and including a inflection point with respect to a height direction of warping of the bridge portion;

a magnetic head attached to the tongue portion and electrically connected to the wirings of the wiring member; and a piezoelectric element bonded to the bridge portion at a section between the proximal end portion and the inflection point, the piezoelectric element being configured to expand and contract by an applied voltage in a longitudinal direction of the wiring member.

A hard disk drive (HDD) according to an embodiment, as a magnetic disk device, will be explained with reference to the accompanying drawings.

First Embodiment

Figure 1:
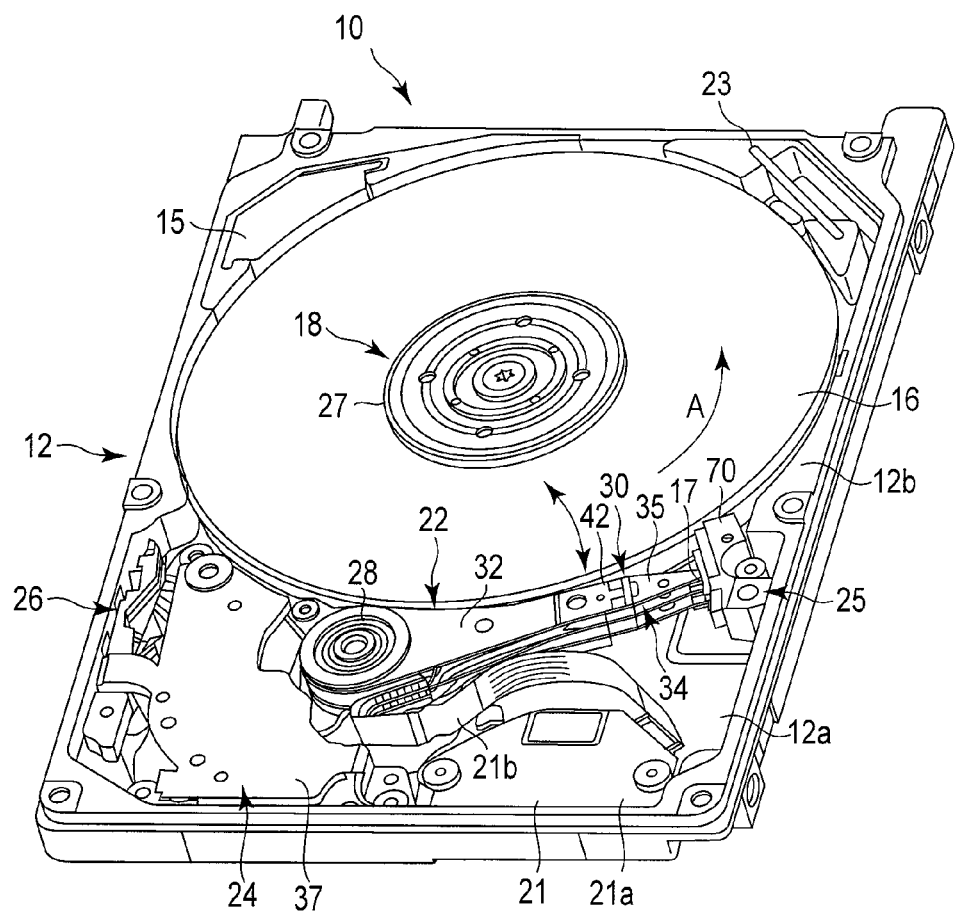
FIG. 1 is a perspective view showing a hard disk drive (HDD) according to a first embodiment.
Figure 2:
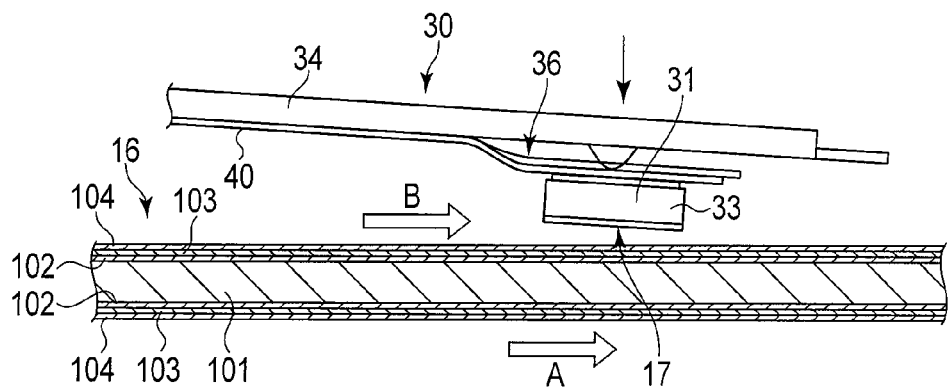
FIG. 2 is a side view showing a magnetic disk, a suspension and a magnetic head of a head gimbal assembly in the HDD.

FIG. 1 shows an internal structure of an HDD, with a top cover detached therefrom, and FIG. 2 schematically shows a magnetic disk and a magnetic head being in a floated (flying) state. As shown in FIG. 1, the HDD is provided with a housing 10. The housing 10 comprises a base 12 formed in the shape of a rectangular box which is open on its upper side, and a top cover (not shown) fixed to the base 12 by a plurality of screws to cover an upper opening of the base 12. The base 12 includes a rectangular bottom wall 12a and a side wall 12b provided upright along a peripheral edge of the bottom wall 12a.

In the housing 10 are arranged two magnetic disks 16 as storage mediums, and a spindle motor 18 provided as a driving section which supports and rotates the magnetic disks 16. The spindle motor 18 is disposed on the bottom wall 12a. The magnetic disks 16 are engaged coaxially with a hub (not shown) of the spindle motor 18, clamped by a clamp spring 27, and thereby fixed to the hub. The magnetic disks 16 are supported in parallel with the bottom wall 12a of the base 12.

The magnetic disks 16 are rotated at a predetermined speed by the spindle motor 18 in a direction indicated by arrow A.

A plurality of magnetic heads 17 and a head stack assembly (hereinafter referred to as an HSA) 22 are arranged in the housing 10. The magnetic heads 17 are configured to write and read information on and from the magnetic disks 16, and the HSA 22 supports the magnetic heads 17 such that they are movable with respect to the magnetic disks 16. In the housing 10 are arranged a voice coil motor (VCM) 24, a ramp load mechanism 25, a latch mechanism 26 and a board unit 21. The VCM 24 rotates and positions the HSA 22, the ramp load mechanism 25 holds the magnetic heads 17 in unload positions where they are separated from the magnetic disks 16, when the magnetic heads 17 are moved to outermost circumferential part of the magnetic disks 16, the latch mechanism 26 holds the HSA in a retreat position when an impact or the like acts on the HDD, and the board unit 21 includes a conversion connector, etc. It should be noted that the latch mechanism 26 is not necessarily limited to a mechanical one, and a magnetic latch may be used.

A printed circuit board (not shown) is attached to an outer surface of the bottom wall 12a of the base 12. The printed circuit board controls operations of the spindle motor 18, the VCM 24 and the magnetic heads 17 through the board unit 21. A circulation filter 23 configured to capture dust caused in the housing 10 by the operations of the movable parts is provided on the side wall 12b of the base 12, and is positioned outside the magnetic disks 16. Further, a breather filter 15 configured to capture dust from the air flowing into the housing 10 is provided on the side wall 12b of the base 12.

As shown in FIG. 1, the HSA 22 comprises a rotatable bearing unit 28, four arms 32 attached to the bearing unit 28 in a stacked state, head gimbal assemblies (hereinafter referred to as HGAs) 30, and spacer rings (not shown) provided between the arms 32 arranged in the stacked state. Each of the arms 32 is formed of, for example, stainless steel, aluminum or the like into an elongate and thin plate-shape. Each arm 32 includes a distal end portion at its extended end side. At the distal end portion, a caulking seating face having a caulking hole (not shown) is formed.

As shown in FIGS. 1 and 2, each of the magnetic disks 16 comprises a substrate 101 formed of a nonmagnetic substance and in the shape of a disc having a diameter of approximately 2.5 inches (6.35 cm). On both surfaces of the substrate 101, soft magnetic layers 102, magnetic recording layers 103 and protection film layers 104 are stacked in this order. The soft magnetic layers 102 are provided as underlying layers and formed of material assuming a soft magnetic characteristic.

As shown in FIG. 2, each of the magnetic heads 17 is formed as a flying type head, and comprises a slider 31 formed in a substantially rectangular parallelepiped shape, and a head section 33 formed in an outflow end (trailing) side of the slider. Each magnetic head 17 is supported on a distal end portion of a suspension 34 by a gimbal portion of a flexure, which will be described later. Each magnetic head 17 is flied by airflow B which is generated between a surface of the magnetic disk 16 and the slider 31 by rotation of the magnetic disk 16. The direction of airflow B is coincident with a rotating direction of the magnetic disk 16. The slider 31 is arranged such that its longitudinal direction is substantially coincident with the direction of airflow B with respect to the surface of the magnetic disk 16.

Figure 3:
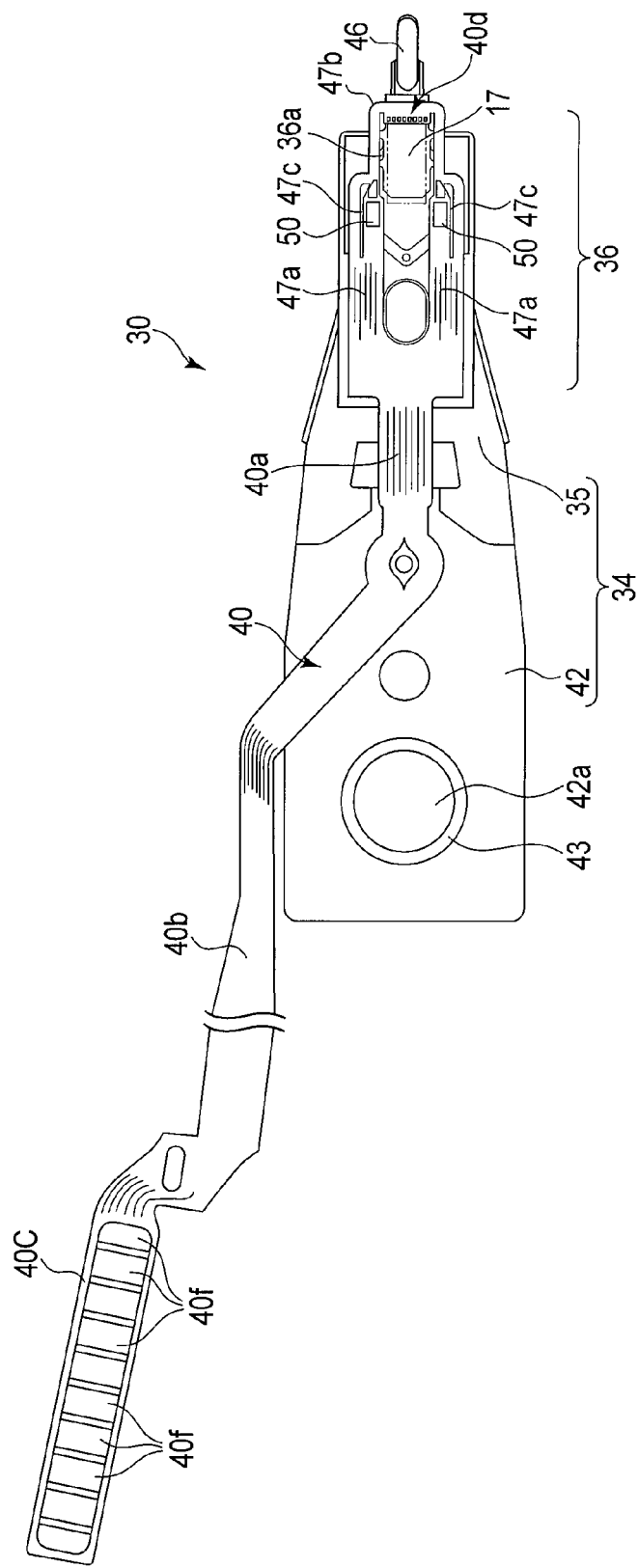
FIG. 3 is a plan view of the head gimbal assembly.

Next, structures of the HGAs 30 will be explained in detail. FIG. 3 is a plan view of each of the HGAs 30, and FIG. 4 is a perspective view of each HGA.

Figure 4:
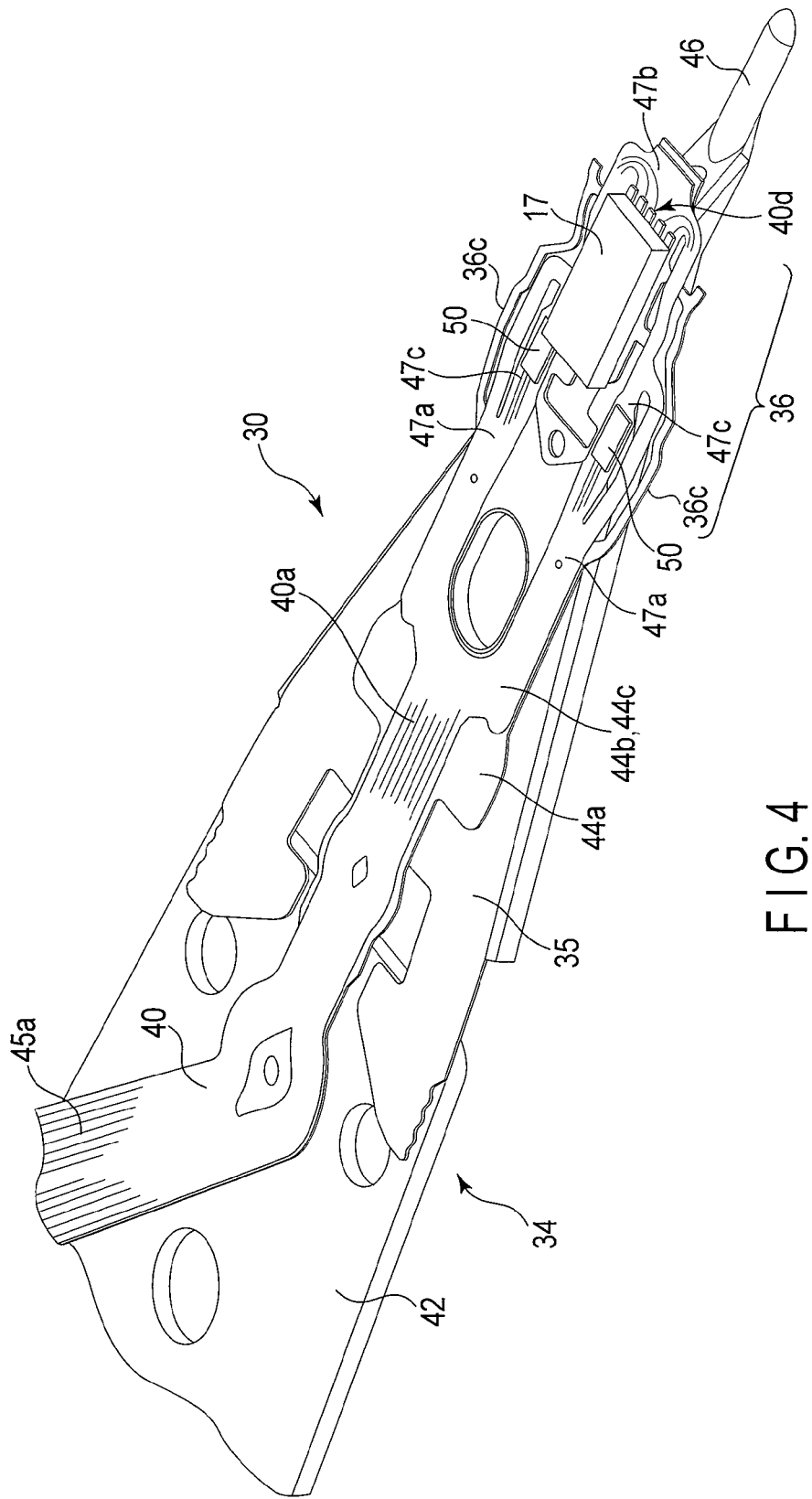
FIG. 4 is a perspective view showing the head gimbal assembly.

As shown in FIGS. 1, 3 and 4, the HGA 30 comprises the suspension 34 extending from the arm 32, and the magnetic head 17 supported on the extended end of the suspension 34.

The suspension 34, which functions as a supporting plate, includes a rectangular base plate 42 formed of a metal plate having a thickness of several hundreds of microns, and a load beam 35 formed of a metal plate with a thickness of tens of microns in a shape of an elongate and thin leaf spring. The load beam 35 has a proximal end portion located on a distal end portion of the base plate 42, and is fixed to the base plate 42 by welding a plurality of portions of the load beam 35. The proximal end potion of the load beam 35 has a width substantially equal to that of the base plate 42. An elongate and thin rod-shaped tab 46 is provided at the distal end of the load beam 35 in a protruding manner.

The base plate 42 includes, at a proximal-end portion thereof, a circular opening 42a, and annular protrusion 43 positioned around the opening 42a. By fitting the protrusion 43 of the base plate 42 in the circular caulking hole (not shown) formed in the seating face for caulking provided on the arm 32, and caulking the protrusion 43, the base plate 42 is fastened to the distal-end portion of the arm 32. The distal end of the base plate 42 may be fixed to the distal end of the arm 32 with swaging.

The HGA 30 comprises a pair of piezoelectric elements (PTZ elements) 50 and a flexure (wiring member) 40 formed in the shape of an elongate belt-shape and configured to transmit a recording signal and a reproduction signal for the magnetic head 17 and a drive signal for the piezoelectric elements 50. As shown in FIGS. 3 and 4, the flexure 40 includes a distal end portion 40a attached to upper surfaces of the load beam 35 and the base plate 42, and a posterior-half portion (extension portion) 40b extending outwards from a side edge of the base plate 42 and along a side edge of the arm 32. Also, the flexure 40 includes a connecting end portion 40c which is located at a distal end of the extension portion 40b, and also which is connected to a main FPC 21b which will be described later.

The distal end portion of the flexure 40, which is located on the distal end portion of the load beam 35, forms the gimbal portion 36. The magnetic head 17 and piezoelectric elements 50 are mounted on the gimbal portion 36. The magnetic head 17 is fixed onto the gimbal portion 36, and is supported on the load beam 35 through the gimbal portion 36. The pair of piezoelectric elements (PZT elements) 50 are attached to the gimbal portion 36, and located in the vicinity of the magnetic head 17 on the proximal end side of the load beam 35 with respect to the magnetic head 17.

Figure 5:
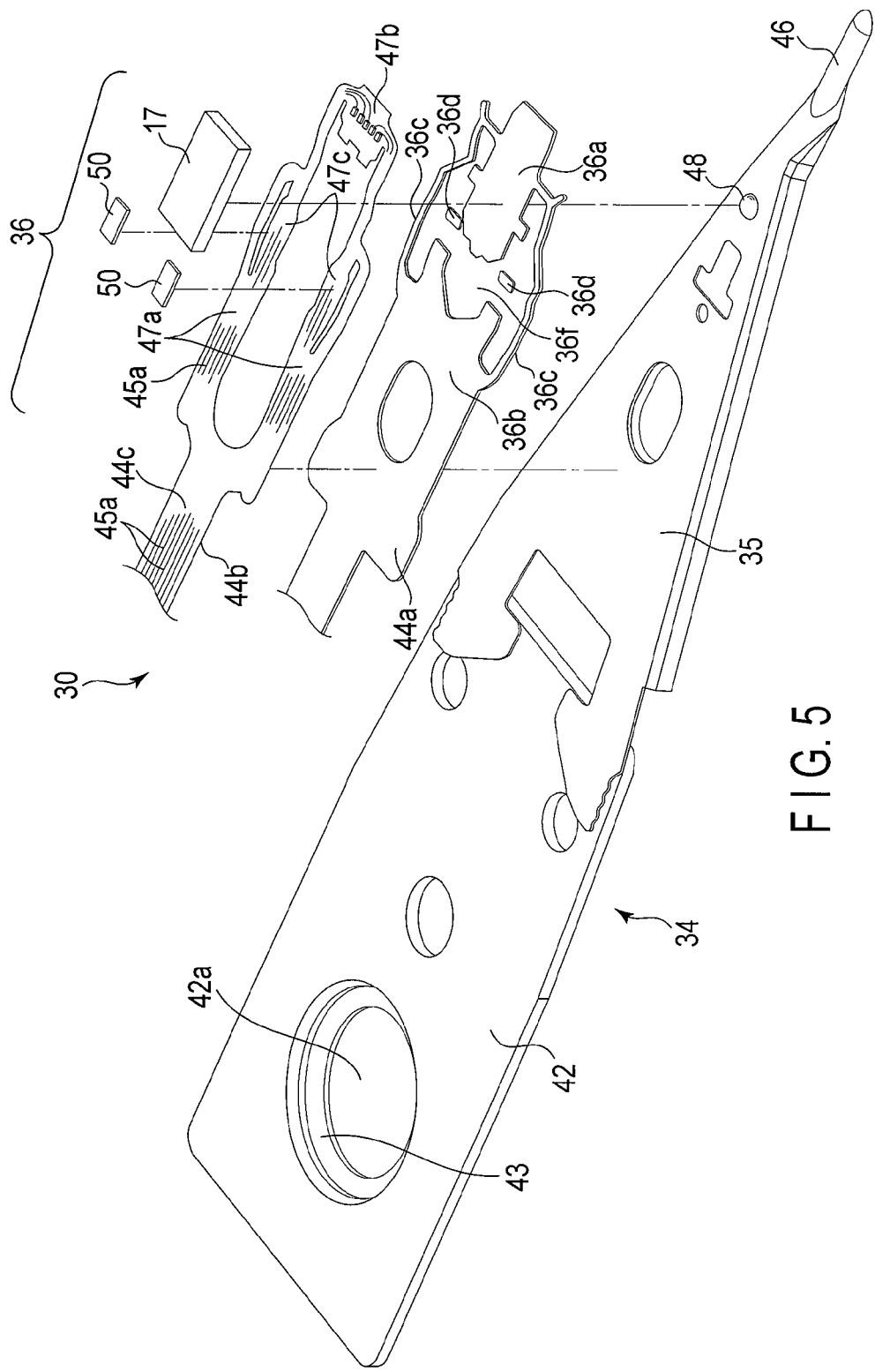
FIG. 5 is an exploded view showing a load beam, a flexure, piezoelectric elements and the magnetic head of the head gimbal assembly.

FIG. 5 is an exploded perspective view of the magnetic head, the piezoelectric elements, the flexure and the load beam of each HGA 30; and FIG. 6 is a plan view of the distal end portion of each HGA 30.

As shown in FIGS. 3 to 6, the flexure 40 comprises a thin metallic plate (lining layer) 44a formed as a base and also formed of stainless or the like, an insulating layer 44b formed on the thin metallic plate 44a, a conductive layer (wiring pattern) 44c formed on the insulating layer 44b and constituting a plurality of wirings 45a, and a protection layer (insulating layer, not shown) covering the conductive layer 44c. The flexure 40 constitutes an elongate belt-shaped laminated plate. The flexure 40 is attached to the surfaces of the load beam 35 and base plate 42 at the thin metallic plate 44a side thereof by adhering or laser welding.

In the gimbal portion 36 of the flexure 40, the thin metallic plate 44a includes: a rectangular tongue portion 36a located at the distal end side; a rectangular proximal end portion 36b located on the proximal end side, with a space 36f interposed between the proximal end portion 36b and the tongue portion 36a; a pair of link portions 36c extending from the tongue portion 36a to the proximal end portion 36b; and a pair of island-shaped support portions 36d located in the space 36f between the tongue portion 36a and the proximal end portion 3b. The proximal end portion 36b is fixed onto a surface of the load beam 35 by spot welding or the like. A substantially central portion of the tongue portion 36a is in contact with a dimple (support convex portion) 48 projectingly provided at the distal end portion of the load beam 35. The tongue portion 36a and the magnetic head 17 fixed onto the tongue portion 36a can be rocked or rolled about the dimple 48 by elastic deformation of the link portions 36c.

At the gimbal portion 36, the insulating layer 44b and the conductive layer 44c of the flexure 40 are formed to branch into two parts, and include: proximal end portion 47a fixed onto the proximal end portion 36b of the thin metallic plate 44a; a distal end portion 47b bonded onto the tongue portion 36a; and a pair of elongate bridge portions 47c extending from the proximal end portion 47a to the distal end portion 47b and the tongue portion 36a, and also extending in the longitudinal direction of the load beam 35. The island-shaped support portions 36d are fixed to respective middle portions of the bridge portions 47c.

The magnetic head 17 is fixed to the tongue portion 36a by an adhesive, with a part of the distal end portion 47 of the flexure 40 interposed between the magnetic head 17 and the tongue portion 36a. The magnetic head 17 is electrically connected to the wirings 45a through a plurality of connection pads 40d formed at the distal end portion 47b. As the pair of piezoelectric elements 50, for example, thin film piezoelectric elements formed in the shape of a rectangular plate are applied. The piezoelectric elements 50 are bonded to the bridge portions 47c by an adhesive or the like, respectively. The piezoelectric elements 50 are arranged such that their longitudinal direction is in parallel to those of the load beam 35 and the bridge portions 47c. Thus, the pair of piezoelectric elements 50 are arranged side by side in parallel with each other, and located on both sides of the magnetic head 17. The piezoelectric elements 50 are electrically connected to the wirings 45a.

As shown in FIGS. 3 and 4, the wirings 45a of the flexure 40 include wirings 45a for transmitting a recording and reproduction signal to the magnetic head 17, which extend to the magnetic head 17, and are connected to the connection pads 40d. The connection pads 40d are electrically connected to a recording and reproduction element of the magnetic head 17 by solder. Also, the wirings 45a of the flexure 40 include wirings 45a for transmitting a drive signal to the piezoelectric elements 50, which extend to the vicinity of the piezoelectric elements 50, and include extension ends having connection pads (not shown). The connection pads and the piezoelectric elements 50 are electrically connected to each other by solder or a conductive adhesive agent such as silver paste. It should be noted that the wirings 45a of the flexure 40 extend to a connecting end portion 40c of the flexure 40 along the flexure 40, and are connected to connection pads 40f provided at the connecting end portion 40c.

FIG. 7 is a cross-sectional view showing the bridge portion, with a piezoelectric element 50 not still mounted; and FIG. 8 is a cross-sectional view showing the bridge portion, with the piezoelectric elements 50 mounted.

As shown in FIGS. 6 and 7, the tongue portion 36a of the flexure 40 is located on the dimple (convex portion) 48 of the load beam 35, and also located at a higher position than the proximal end portion 47a of the flexure 40. In a direction perpendicular to a surface of the load beam 35, the tongue portion 36a is located further apart from the load beam 35 than the distal end portion 47b. Thus, the bridge portion 47c bridged between the proximal end portion 47a and the tongue portion 36a is naturally and sigmoidally warped from the proximal end portion 47a to the tongue portion 36a into a substantially S-shape in accordance with a projection height of the dimple 48, i.e., in accordance with the difference between a height of the proximal end portion 47a and that of the tongue portion 36a in the direction perpendicular to the surface of the load beam 35. Thereby, the bridge portion 47c has a warp inflection point P in a height direction at a substantially central portion of the bridge portion 47c in a longitudinal direction thereof. That is, the bridge portion 47c is warped such that a section between the proximal end portion 47a and the inflection point P is warped in a convexedly arcuate shape toward the load beam 35, and also a section between the inflection point P and the tongue portion 36a is warped in a convexedly arcuate shape in a direction away from the load beam 35.

As shown in FIGS. 6 and 8, the piezoelectric element 50 is bonded by an adhesive agent 51 to a surface of the bridge portion 47c (which is located opposite to a surface facing the load beam 35) at the section of the bridge portion 47c which is located between the proximal end portion 47a and the inflection point P. The support plate 36d of the thin metallic plate 44a is fixed to a reverse surface of the bridge portion 47c (which faces the load beam 35) in the vicinity of the inflection point P (especially, on a proximal end portion (47a) side from the inflection point P). In the longitudinal direction of the piezoelectric element 50, one of end portions of the piezoelectric element 50 is fixed to the bridge portion 47c while being partially stacked on the support portion 36d, and the other end portion is fixed to the bridge portion 47c while being partially stacked on the proximal end portion 47a.

Since the piezoelectric element 50 is provided in the above manner, the both end portions of the piezoelectric element 50 in the longitudinal direction thereof can be brought in contact with the bridge portion 47c. Therefore, the both end portions of the piezoelectric element 50 in the longitudinal direction thereof can be stably and reliably made to adhere to the bridge portion 47c, and can thus be prevented from peeling from the bridge portion 47c. As a result, it is possible to restrict variance between displacement (stroke amount) of the piezoelectric element 50 and variation of a resonance characteristic of the piezoelectric element 50.

Figure 9:
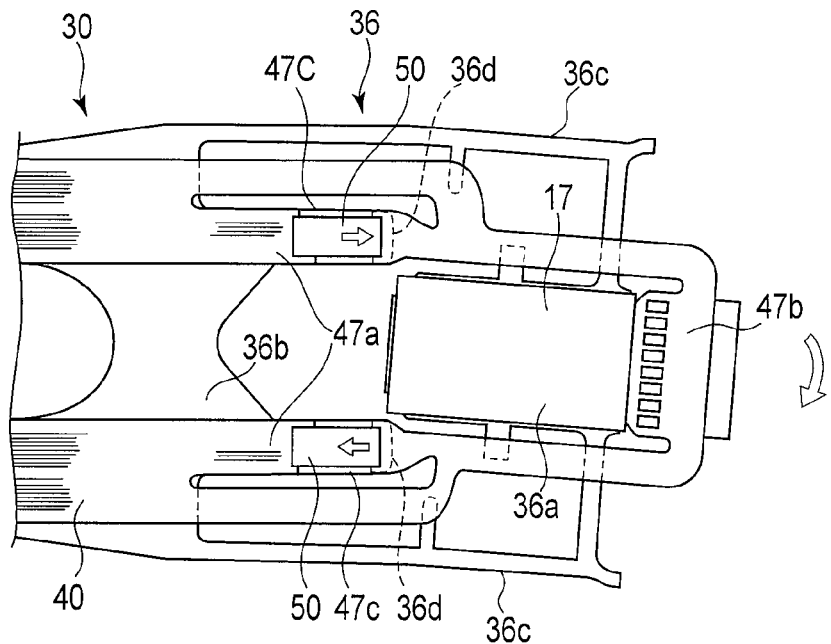
FIG. 9 is a plan view schematically showing a state of a magnetic head minutely displaced by piezoelectric elements.

When a voltage is applied to the piezoelectric elements 50 through the wirings 45a, the piezoelectric elements 50 are expanded or contracted in their longitudinal direction. To be more specific, as shown in FIG. 9, the piezoelectric elements 50 are extended and contracted in opposite directions, thereby enabling the tongue portion 36a of the gimbal portion 36 to be rocked along with the flexure 40, and the magnetic head 17 to be displaced in the seeking direction.

As shown in FIG. 1, the HSA 22 includes a support frame extending from the bearing unit 28 in a direction away from the arms 32, and the support frame includes a voice coil which is embedded therein, and which forms part of the VCM 24. Each of the magnetic disks 16 is located between associated two of the HGAs 30, with the HSA 22 mounted in the base 12. While the HDD is being operated, the magnetic heads 17 of the HGAs 30 face upper and lower surfaces of the magnetic disks 16, and are located on both sides of the magnetic disks 16. The voice coil, which is fixed to the support frame, is located between a pair of yokes 37 fixed onto the base 12. The voice coil, the yokes 37 and a magnet (not shown) fixed to one of the yokes 37 constitute the VCM 24.

As shown in FIG. 1, the board unit 21 includes a main body 21a comprising a flexible printed circuit board. The main body 21a is fixed to the bottom wall 12a of the base 12. Electronic components (not shown) such as a conversion connector, etc. are mounted on the main body 21a. A connector (not shown) for connection with the print circuit board is mounted on a bottom surface of the main body 21a.

The board unit 21 includes a main flexible print circuit board (hereinafter referred to as a main FPC) 21b extending from the main body 21a. An extended end of the main FPC 21b forms a connecting end portion, and is fixed in the vicinity of the bearing unit 28 of the HSA 22. The connecting end portion 40c of the flexure 40 of each HGA 30 is mechanically and electrically connected to the connecting end portion of the main FPC 21b. Thereby, the board unit 21 is electrically connected to the magnetic heads 17 and the piezoelectric elements 50 by the main FPC 21b and the flexures 40.

As shown in FIG. 1, the ramp load mechanism 25 comprises a ramp 70 located on the bottom wall 12 of the base 12 and outward of the magnetic disks 16, and tabs 46 (see FIGS. 3 to 5) extending from the distal ends of the suspensions 34. In the case where the HSA 22 is rotated about the bearing unit 28, and the magnetic heads 17 are moved to retreat positions located outward of the magnetic disks 16, each of the tabs 46 is engaged with a ramped surface formed at the ramp 70, and then pulled upwards due to a slant of the ramped surface. As a result, the magnetic heads 17 are unloaded form the magnetic disks 16, and held in the retreat positions.

In the HDD and the HGA 30 with the above mentioned structure, the piezoelectric elements 50 are attached to the bridge portions 47c of the flexures (wiring member) 40, and a voltage is applied to the piezoelectric elements 50 through the flexures 40, thereby enabling the magnetic head 17 attached to the gimbal portion 36 to be displaced in the seeking direction. By virtue of this feature, it is possible to minutely control the position of the magnetic head 17 by controlling the voltage to be applied to the piezoelectric elements 50, and thus improve the accuracy of positioning of the magnetic head.

Each of the piezoelectric elements 50 is bonded by the adhesive agent 51 to a surface of part of the bridge portion 47c, which is located within a section between the proximal end portion 47a and the inflection point P. Thus, the both end portions of the piezoelectric element 50 in the longitudinal direction can be set in contact the bridge portion 47c, and be reliably made to adhere to the bridge portion 47c. As a result, the both end portions are prevented from peeling off the bridge portion 47c. Therefore, it is possible to ensure that the magnetic heads 17 can be driven without loss of driving amount with respect to displacement amounts (stroke amount) of the piezoelectric elements 50. In addition, by preventing peeling or floating of the piezoelectric elements 50, it is also possible to prevent excitation of unnecessary resonance of the piezoelectric elements 50, and improve the resonance characteristics thereof.

Figure 10:
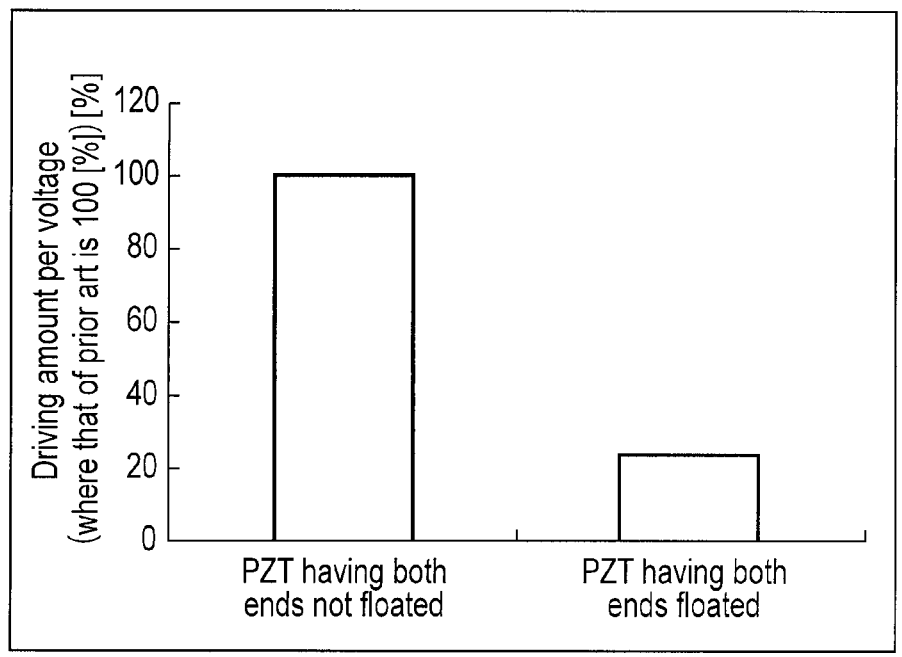
FIG. 10 is a view showing a result of driving amounts of magnetic heads per voltage, which are simulated by a finite-element analysis, in the case where in a head gimbal assembly according to the first embodiment, both end portions of each of piezoelectric elements are fixed and in the case where in a head gimbal assembly according to a comparative example, both end portions of each of piezoelectric elements are in a floated state.

FIG. 10 is a view showing a result of driving amounts of magnetic heads per voltage, which are simulated by a finite-element analysis, in the case where in a head gimbal assembly according to the first embodiment, both end portions of each of piezoelectric elements are fixed and in the case where in a head gimbal assembly according to a comparative example, both end portions of each of piezoelectric elements are in a floated state. From this figure, it can be seen that the driving amount (displacement width) of the magnetic head 17 is 100% in the case where the both end portions of each piezoelectric element 50 are properly made to adhere to the wiring member, and are not floated, as in the embodiment, whereas the driving amount of the magnetic head 17 are approximately 20% in the case where the both end portions of each piezoelectric element are in a floated state; that is, its loss is great. In addition, since the degree of the loss depends on the degree of floating of each piezoelectric element, if adhesion of the both end portions of each piezoelectric element is stably achieved, the magnetic head can be driven without loss of driving amount, and simultaneously the variation of its driving amount can be reduced.

Next, HGAs according to another embodiments will be described. In another embodiments, elements identical to those in the first embodiment will be denoted by the same reference numerals and signs, and their detailed explanations will be omitted.

Second Embodiment

Figure 11:
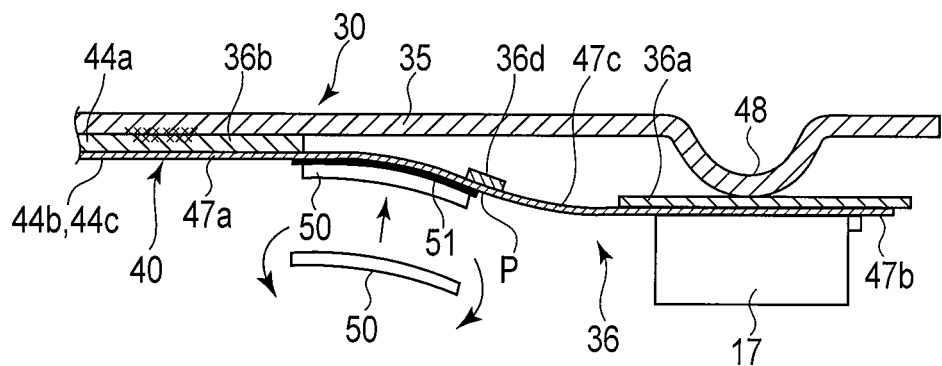
FIG. 11 is a cross-sectional view of a piezoelectric-element mounting portion in a head gimbal assembly according to a second embodiment.

FIG. 11 is a cross-sectional view showing a piezoelectric element and a bridge portion in an HGA 30 according to a second embodiment. According to the second embodiment, a piezoelectric element 50 is curved in advance such that its curve is coincident with that of a section of a bridge portion 47c, which is located between a proximal end portion 47a and an inflection point P. The piezoelectric element 50 is bonded by an adhesive agent 51 to a surface of the bridge portion 47c (which is located opposite to a load beam 35) at the above section located between the proximal end portion 47a and the inflection point P. The piezoelectric element 50 is also kept curved after being mounted.

According to the second embodiment, the curved states of the bridge portion 47c and the piezoelectric element 50 are made coincident with each other, and they can thus be made to further stably adhere to each other. Furthermore, in the case where the piezoelectric element 50 is a thin film piezoelectric element, a given compression stress acts in the piezoelectric element due to the curve thereof, thus increasing a displacement constant per voltage. Therefore, according to the second embodiment, the piezoelectric element can be made to stably adhere to the bridge portion 47c, and in addition a higher displacement constant can be obtained without the need to replace the piezoelectric element to another one.

Third Embodiment

Figure 12:
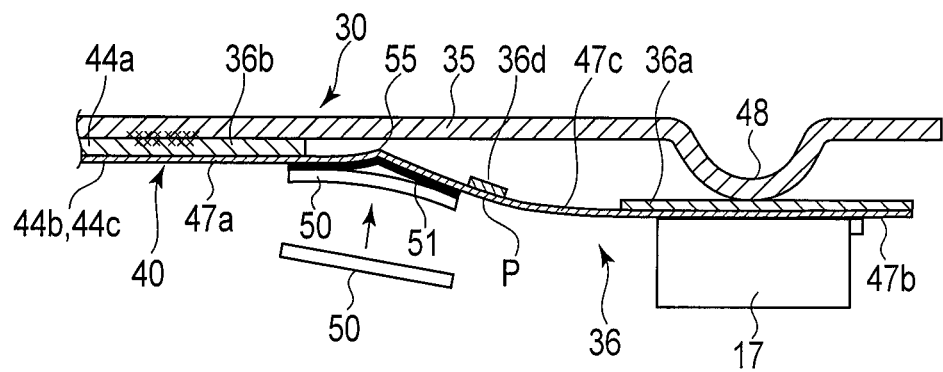
FIG. 12 is a cross-sectional view of a piezoelectric-element mounting portion in a head gimbal assembly according to a third embodiment.

FIG. 12 is a cross-sectional view showing a piezoelectric element and a bridge portion in an HGA 30 according to a third embodiment. According to this embodiment, at least one portion of a bridge portion 47c is subjected to curving processing, and formed as a bent portion 55 which is convex toward a load beam 35. The bent portion 55 is provided between a proximal end portion 47a of the bridge portion 47c and an inflection point P. Furthermore, between the proximal end portion 47a of the bridge portion 47c and the inflection point P, a piezoelectric element 50 is fixed by an adhesive agent 51 in such a way as to bridge the bent portion 55.

As a result, both end portions of the piezoelectric element 50 in a longitudinal direction thereof can be brought in contact with the bridge portion 47c, and can also be made to stably and reliably adhere to the bridge portion 47c.

It should be noted that the location of the bent portion 55 is not limited to that between the proximal end portion 47a of the bridge portion 47c and the inflection point P; that is, the bent portion 55 may be provided at another location. For example, the bent portion 55 may be provided at the inflection point P, and the piezoelectric element 50 may be bonded to the bridge portions 47c in such a way as to bridge the bent portion 55. In this case, the both end portions of the piezoelectric element 50 in the longitudinal direction thereof can be made to reliably adhere to the bridge portion 47c.

In the second and third embodiments, it is possible to prevent peeling or floating of the both end portions of the piezoelectric element, and improve the displacement width of the magnetic head due to the piezoelectric elements. Further, it is possible to prevent excitation of unnecessary resonance of the piezoelectric element, and improve the resonance characteristic thereof.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

In the above embodiments, as the arms of the HSA, plate-shaped arms formed independent of each other are applied. However, the arms of the HSA are not limited to the plate-like arms; that is, the arms may be formed in the shape of so-called E-type block and integral with bearing sleeves. Furthermore, the size of each of the magnetic disks is not limited to 2.5 inches; that is, magnetic disks each having another size may be applied. The number of magnetic disks is not limited to two; that is, a single magnetic disk or three or more magnetic disks may be applied. Also, the number of HGAs may be changed in accordance with the number of magnetic disks.

What is claimed is:

1. A suspension assembly comprising:
   a support plate with a convex portion;
   a wiring member comprising a metallic plate, an insulating layer on the metallic plate and a conductive layer on the insulating layer, to form a plurality of wirings, the wiring member further comprising a support portion located on the convex portion, a proximal end portion fixed onto the support plate, and a bridge portion bridged between the support portion and the proximal end portion, the bridge portion comprising a middle portion between the proximal end portion and the support portion, a first curved portion convex toward the support plate between the proximal end portion and the middle portion, and a second curved portion convex in a direction opposite to the support plate between the middle portion and the support portion, the middle portion being at a boundary between the first and second curved portions; and
   a drive element attached to the first curved portion except for the second curved portion, the drive element being configured to expand and contract according to an applied voltage in a longitudinal direction of the wiring member.

2. The suspension assembly of claim 1, wherein the drive element is provided only at the first curved portion of the bridge portion.

3. The suspension assembly of claim 1, wherein the metallic plate further comprises an island-shaped portion located between the proximal end portion and the support portion and attached to the bridge portion close to the middle portion.

4. The suspension assembly of claim 3, wherein the drive element is attached to the bridge portion such that a longitudinal direction of the drive element is coincident with a longitudinal direction of the bridge portion, and both end portions of the drive element in the longitudinal direction thereof are in contact with the wiring member.

5. The suspension assembly of claim 4, wherein one of end portions of the drive element in the longitudinal direction is fixed to the wiring member while being partially stacked on the island-shaped portion, and the other end portion is fixed to the wiring member while being partially stacked on the proximal end portion.

6. The suspension assembly of claim 1, wherein the drive element is formed in a curved shape in accordance with curves of the first curved portion.

7. A head suspension assembly comprising:
   the pension assembly of claim 1; and
   a magnetic head supported on the support portion.

8. The head suspension assembly of claim 7, wherein the drive element is provided only at the first curved portion of the bridge portion.

9. The head suspension assembly of claim 7, wherein the metallic plate further comprises an island-shaped portion located between the proximal end portion and the support portion and attached to the bridge portion close to the middle portion.

10. The head suspension assembly of claim 9, wherein the drive element is attached to the bridge portion such that a longitudinal direction of the drive element is coincident with a longitudinal direction of the bridge portion, and both end portions of the drive element in the longitudinal direction thereof are in contact with the wiring member.

11. The head suspension assembly of claim 10, wherein one of end portions of the drive element in the longitudinal direction is fixed to the wiring member while being partially stacked on the island-shaped portion, and the other end portion is fixed to the wiring member while being partially stacked on the proximal end portion.

12. The head suspension assembly of claim 7, wherein the drive element is formed in a curved shape in accordance with curves of the first curved portion.

13. A disk device comprising:
    a disk recording medium; and
    the head suspension assembly of claim 7.

14. The disk device of claim 13, wherein the drive element is provided only at the first curved portion of the bridge portion.

15. The disk device of claim 13, wherein the metallic plate further comprises an island-shaped portion located between the proximal end portion and the support portion and attached to the bridge portion close to the middle portion.

16. The disk device of claim 15, wherein the drive element is attached to the bridge portion such that a longitudinal direction of the drive element is coincident with a longitudinal direction of the bridge portion, and both end portions of the drive element in the longitudinal direction thereof are in contact with the wiring member.

17. The disk device of claim 16, wherein one of end portions of the drive element in the longitudinal direction is fixed to the wiring member while being partially stacked on the island-shaped portion, and the other end portion is fixed to the wiring member while being partially stacked on the proximal end portion.

18. The disk device of claim 13, wherein the drive element is formed in a curved shape in accordance with curves of the first curved portion.

* * * * *